(12) United States Patent
Bai et al.

(10) Patent No.: US 6,876,818 B1
(45) Date of Patent: Apr. 5, 2005

(54) METHOD AND SYSTEM FOR TRANSMITTING SIGNALS WITH SPECTRALLY ENRICHED OPTICAL PULSES

(75) Inventors: Yu Sheng Bai, Redwood City, CA (US); Clarence Kan, Cupertino, CA (US); Dzhakhangir V. Khaydarov, Campbell, CA (US); Robert Brogle, Mountain View, CA (US); Tatiana V. Rossin, Mountain View, CA (US); Ilya M. Fishman, Palo Alto, CA (US)

(73) Assignee: FutureWei Technologies, Inc., Plano, TX (US)

( * ) Notice: Subject to any disclaimer, the term of this patent is extended or adjusted under 35 U.S.C. 154(b) by 404 days.

(21) Appl. No.: 09/642,033

(22) Filed: Aug. 18, 2000

(51) Int. Cl.$^7$ .............................................. H04B 10/00
(52) U.S. Cl. ..................... 398/154; 398/146; 398/148; 398/183; 398/186; 398/185; 398/189; 398/81; 398/199; 398/91
(58) Field of Search .............................. 398/91, 80–81, 398/146, 148, 154, 183, 185, 186, 188, 189, 199

(56) References Cited

U.S. PATENT DOCUMENTS

| | | | | |
|---|---|---|---|---|
| 5,473,458 A | * | 12/1995 | Mamyshev et al. | 398/160 |
| 5,515,196 A | * | 5/1996 | Kitajima et al. | 398/185 |
| 6,005,702 A | | 12/1999 | Suzuki et al. | 359/183 |
| 6,011,638 A | * | 1/2000 | Mamyshev et al. | 398/147 |
| 6,021,235 A | * | 2/2000 | Yamamoto et al. | 385/24 |
| 6,122,088 A | * | 9/2000 | Hasegawa | 398/199 |
| 2002/0191262 A1 | * | 12/2002 | Yamada et al. | 359/183 |

OTHER PUBLICATIONS

Article by Suzuki, et al entitled "*Reduction of Gordon–Haus timing jitter by periodic dispersion compensation in soliton transmission,*" published in *Electronic Letters*, 9$^{th}$ Nov. 1995, vol. 31, No. 23, pp. 2027–2029.
Article by Nijhof, et al "*Dispersion–managed solitons in the normal dispersion regime: a physical interpretation*", published in *Optical Letters*, Nov. 1, 1998, vol. 23, No. 21, pp. 1674–1676.
Article by Favre, et al entitled "*Experimental evidence of Pseudoperiodical Soliton Propagation in Dispersion–Managed Links*", published in Journal of Lightwave Technology, Jun. 1999, vol. 17, No. 6, pp. 1032–1036.
Book by Govind P. Agrawal "*Nonlinear Fiber Optics*", published by Academic Press, Inc with AT&T, 1989.
Book by Ivan P. Kaminow and Thomas L. Koch "*Optical Fiber Telecommunications 111A*", published by academic Press, Inc.. 1997.
Book by Godvin P. Agraval and Niloy K. Dutta, "Semiconductor Lsers", Second Edition, New Uork, 1993, pp. 284–297.

* cited by examiner

*Primary Examiner*—Kinfe-Michael Negash
(74) *Attorney, Agent, or Firm*—Gary L. Bush; Andrews Kurth LLP

(57) ABSTRACT

A system and method for transmission of data modulated spectrally enriched optical pulses via an error free propagation region of an optical fiber, in which the optical pulses generated by an optical transmitter have a spectrum that is substantially wider than the spectrum of Fourier-transform limit at an input of the error-free propagation region. The spectral width of the optical pulses gradually narrows while transmitting along this region and becomes comparable to the Fourier-transform limit at an output of this region. Linear and non-linear distortions are compensated within the error free propagation region respectively by deployment of dispersion compensating units and phase modulation of transmitted optical pulses for providing them with an appropriate frequency chirp having shape comparable with a frequency chirp induced by a self-phase modulation of the optical fiber but having opposite sign.

12 Claims, 6 Drawing Sheets

US 6,876,818 B1

METHOD AND SYSTEM FOR TRANSMITTING SIGNALS WITH SPECTRALLY ENRICHED OPTICAL PULSES

FIELD OF THE INVENTION

The present invention relates to optical transmission method and system for optical fiber communication network, and more particularly, to Wavelength Division Multiplexing (WDM) optical fiber transmission method and system for transmitting short pulse signals.

BACKGROUND OF THE INVENTION

In the history of commercial deployment of fiber networks, the dominating tendency was to minimize the spectral width of transmitted signals. There have been at least two motivations to pursue spectral minimization: to reduce signal dispersion within transmission line and to simplify the equipment for signal transmission in Non-Return-to-Zero (NRZ) format.

A majority of contemporary WDM transmission systems operate at a data rate of 2.5 Gb/s (OC-48) and utilize standard single-mode fiber (SMF) with chromatic dispersion D about 17 ps/nm*km. In these systems, the transmission distance is limited to about 600 km and does not require dispersion compensation. For WDM systems of higher bit rates (10 and 40 Gbit/s) and similar reach, dispersion compensation is required. Deployment of dispersion compensating means such as dispersion compensating fibers or fiber gratings eliminates unwelcome linear dispersion impairment [A. H. Gnauck and R. M. Jopson, "Dispersion Compensation for Optical Fiber Systems", Chapter 7 in *Optical Fiber Communication Systems*, Vol. IIIA, Ed. I. P. Kaminow and T. L. Koch, Academic Press, San Diego, 1997]).

The performance of dispersion compensated systems with periodic optical amplification is limited by accumulation of spontaneous emission noise and fiber nonlinearity. To optimize the NRZ-format system performance, a fine balance has to be achieved between maximizing optical signal-to-noise ratio and minimizing nonlinear effects such as self-phase modulation (SPM), cross-phase modulation (XPM), and four-wave-mixing (FWM). Conventional power per individual channel at the input of each fiber span is about 1 mW (0 dBm), resulting in a maximum propagation distance of several hundred kilometers. For single channel transmission and for WDM multi-channel transmission in non-dispersion-shifted fibers, SPM is the dominating nonlinear effect. An optical signal propagating in the fiber experiences an intensity dependent phase shift $\phi_{NL}(t,z)$ given by [G. P. Agrawal, *Nonlinear Fiber Optics*, Chapter 4, Academic Press, San Diego, 1989]:

$$\phi_{NL}(t,z) = \gamma P(t) z \quad (1)$$

where $\gamma$ is the nonlinear coefficient of the fiber, P is the optical power, and z is the effective propagation length. Because the signal intensity is time-dependent, new spectral (frequency) components are produced:

$$\Delta\omega = -d\phi_{NL}/dt \quad (2)$$

When coupled with dispersion, these new spectral components interfere with the original components and distort the temporal shape of the signal. The NRZ data stream is a complicated temporal pattern, in which each individual bit is distorted differently than other bits and therefore cannot be globally restored. As a result, NRZ-format transmission systems are designed to work in the linear regime with a small nonlinear phase shift, $\phi_{NL}(t,z) \ll 1$. In general, utilization of NRZ format and minimization of the spectral content limits further development of transmission technology.

Several approaches were developed to overcome the nonlinear distortion problem, all of them based on transmitting short optical pulses, or using return-to-zero (RZ) format. The important advantage of RZ format is that the distortion caused by SPM is pattern-independent. In RZ format, every single bit representing 1 is a single pulse identical to other pulses. If a single pulse is compensated for the SPM distortion, then the whole data stream is compensated automatically.

In retrospect, the first method of nonlinear distortion compensation was the propagation of optical solitons [L. F. Mollenauer, J. P. Gordon, and P. V. Mamyshev, "Solitons in High Bit-Rate, Long-Distance Transmission", Chapter 12 in *Optical Fiber Communication Systems*, Vol. IIIA, Ed. I. P. Kaminow and T. L. Koch, Academic Press, San Diego, 1997]. To create an optical soliton, a Fourier-transform limited optical pulse having maximum power of several dBm is propagated in optical fiber with small positive dispersion. The general idea of soliton propagation is that the pulse shape is affected by chromatic dispersion and nonlinearity in a way that these two factors counterbalance each other. For a certain range of pulse duration and optical power the pulse shape is kept constant along the fiber. The trend of the pulse to expand due to linear dispersion is compensated by contraction due to self-phase modulation so that the pulse is kept intact during the propagation. In other words, the combined effect of linear dispersion and SPM on the propagating pulses is continuously compensated at every point in the fiber. Using soliton transmission technology, Fourier transform limited light pulses of about 10–30 ps duration and peak power of several dBm may be propagated along fiber spans of many thousands of kilometers without significant shape degradation.

The balance between linear and nonlinear contributions, however, could be maintained only within certain ranges of pulse power and dispersion (D<~1 ps/nm*km). The low dispersion requirement limits the applicability of soliton transmission to special types of fiber such as dispersion-shifted fibers (DSF), where the zero dispersion wavelength is 1.5 micron. The power range requirement means that in-line optical amplifiers must be spaced much closer than the customary span length for commercial terrestrial long-haul networks. Further complication is caused by soliton timing jitter (known as the Gordon-Haus effect) induced by the soliton coupling with the accumulated amplifier noise. Special filtering schemes were developed to reduce the timing jitter and allow for extra long propagation of signals. However, these schemes are generally too complicated to deploy in commercial transmission systems. As a result, the soliton transmission though studied for almost 20 years has not found commercial applications.

In the last few years, a new approach for RZ transmission has been developed called dispersion-managed solitons, or quasi-solitons (M. Suzuki et al, Electronics Lett., Vol. 31, p. 2027, 1995; J. H. B. Nijhof et al, Opt. Lett., Vol 23, p. 1674, 1998; F. Favre et al, Jour. Lightwave Tech., Vol 17, p. 1032, 1999). According to this approach, the nonlinear dispersion is compensated within each span of fiber in a periodically optically amplified fiber transmission line, instead of being continuously compensated at each point of the fiber as in standard soliton transmission. It is based on a basic phenomenon of propagating of linearly frequency chirped pulses in nonlinear media: when the linear chirp and nonlinearity-induced chirp of the pulse are in the same direction the spectral bandwidth of the pulse increases; when they are in the opposite directions the spectral bandwidth decreases. If the linear dispersion of the media periodically changes sign in a properly designed way, the spectral content of the propagating pulse and its shape would also vary periodically. By using appropriate pre-dispersion and arrangement of fibers of positive and negative dispersions, commonly referred to as "dispersion map", one could periodically reconstruct the original pulses, both in terms of duration and spectral bandwidth, at each optical amplifier site along the transmission line. However, to achieve this indefinite oscillatory mode, the dispersion management has to be very precise (have extremely small tolerances) which is difficult to implement in practice.

Hence, the telecommunication industry is in need of new methods and systems for transmitting signals via multiple spans of optical fiber without considerable linear or nonlinear distortions.

SUMMARY OF THE INVENTION

In accordance with the present invention a system is provided for transmitting signals over an optical fiber using spectrally enriched optical pulses. The system is comprised of an optical transmitter with an optical source for generating spectrally enriched optical pulses having a spectrum that is substantially wider than the spectrum of a Fourier-transform limited pulse of the same duration. The optical spectrum of these pulses generated by the optical transmitter is being shrunk while propagating along the optical fiber. An optical receiver is placed within the optical fiber link at or beyond an error free propagation distance from the optical transmitter. The error free propagation distance is the distance along which the temporal shape of the optical pulse does not change significantly. At the input of the optical receiver, the optical pulses are restored to a temporal duration and shape comparable to that at the transmitter, with their spectral content substantially depleted compared to initial spectrum at the transmitter.

Several types of laser sources may be used in the optical transmitter. A directly modulated diode laser is preferable for many commercial applications. The optical transmitter with the directly modulated diode laser comprises a clock generator to drive the directly modulated diode laser in order to provide the optical pulses with a frequency chirp. With appropriate bias voltage and RF power, the directly modulated diode laser frequency chirp has a functional form similar to the functional form of a chirp produced by SPM within the optical fiber but with the opposite sign. To load data onto a stream of frequency chirped optical pulses, an external data modulator is used which is driven by a data generator.

According to another embodiment utilizing the directly modulated diode laser, the optoelectronic integral unit is provided in which the laser is directly modulated both by a clock and a data signal generator.

The optical source may also be a CW diode laser. According to this embodiment, the system comprises a pulse modulator for modulating light generated by CW diode laser. A clock generator is connected to the pulse modulator for generating short optical pulses. The system further comprises a phase modulator that is connected to the pulse modulator for phase modulating the output of the pulse modulator and providing the spectrally enriched optical pulses with a frequency chirp. The temporal form of the frequency chirp of the spectrally enriched optical pulses should be similar to the temporal form of the chirp produced by SPM inside the optical fiber but having the opposite sign.

A mode-locked laser may be utilized in the optical transmitter as yet another type of optical source. The mode-locked laser is connected to and driven by a clock generator. A data modulator connected to the mode-locked laser output is driven by a data generator to modulate the output of the mode-locked laser. A dispersion device is connected to the output of the data modulator for introducing frequency chirp into the optical pulses emitted by the mode-locked laser.

Multichannel WDM communication systems constitute a significant number of optical fiber transmission systems. According to the present invention, a multichannel WDM communication system propagates spectrally enriched optical pulses via an optical fiber, and comprises a plurality of WDM optical transmitters for generating spectrally enriched, data modulated optical pulses within the corresponding plurality of individual optical channels. In every individual channel, the optical pulses are frequency-chirped and have an optical spectrum that is substantially wider than the spectrum of Fourier-transform limited pulses of the same duration. A WDM multiplexer combines the outputs of the WDM optical transmitters into a multiplexed optical signal. The multiplexed optical signal is transmitted via the optical fiber comprising a plurality of spans. An optical amplification and dispersion compensation unit is placed between each pair of adjacent spans. A WDM demultiplexer separates the WDM multiplexed optical signal into a plurality of individual optical channels each having a spectrum comparable with the Fourier-transform limit for pulses of the same duration. A plurality of optical receivers corresponding to the plurality of the WDM optical transmitters receives the optical pulses with enriched spectra. The optical receivers are placed within the optical fiber link at or beyond an error free propagation distance from the optical transmitters.

A method of transmitting signals using spectrally enriched optical pulses via an optical fiber may utilize optical transmitters with different types of optical sources. Optical pulses having enriched optical spectra that are substantially wider than a spectrum of Fourier-transform limited pulses of the same duration are generated by the optical source. The spectrally enriched optical pulses have duration about 20% to 50% of the bit period and a respective bandwidth that exceeds the Fourier-transform limit by 50% to 200%. The spectrally enriched optical pulses are modulated by digital data and transmitted via the optical fiber. While propagating via an error free propagation region of the optical fiber the temporal shape of each pulse is unchanged; however the spectrum is depleted from its initial wide bandwidth down to near the Fourier-transform limit. The error free propagation region comprises a plurality of fiber spans. The intensity and temporal shapes of the optical pulses distorted by dispersion induced by the optical fiber are restored after each span by optical amplifiers and dispersion compensating devices.

BRIEF DESCRIPTION OF DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

Figure 1:
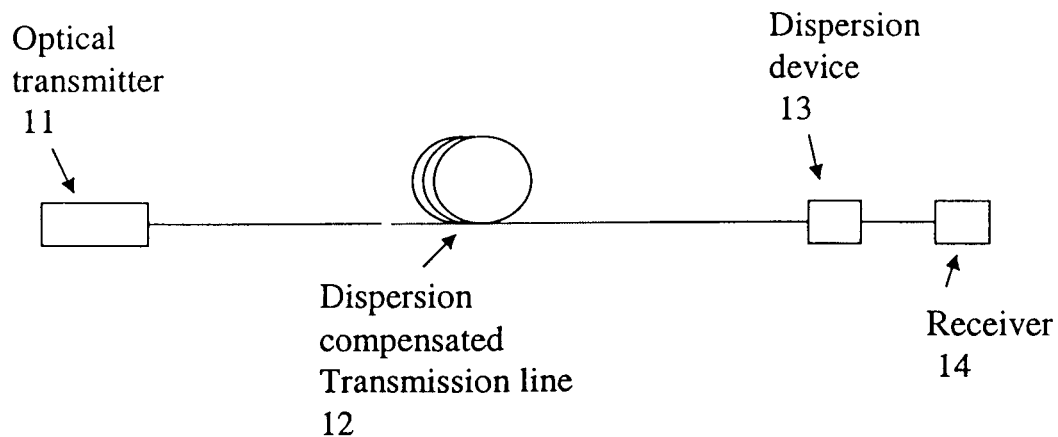
FIG. 1 shows a schematic diagram of a system for transmitting phase and data modulated spectrally enriched optical pulses via a dispersion compensated transmission line according to the present invention.
Figure 2:
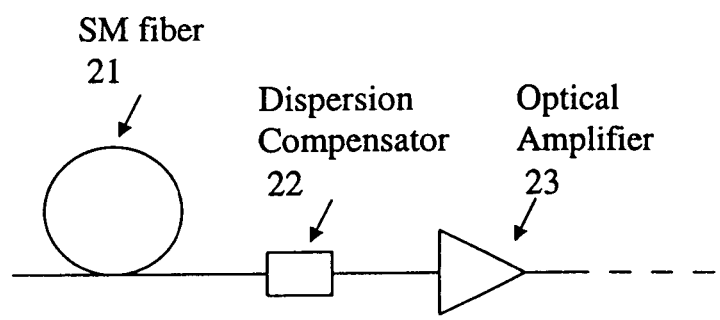
FIG. 2 shows a schematic diagram of a span of the dispersion compensated optical fiber for transmitting the spectrally enriched data modulated optical pulses according to the present invention.

The present invention involves a transmission of phase and data modulated optical pulses having a spectrum enriched compared to the spectrum of Fourier-transform limited optical pulses of the same duration via an optical fiber as shown in FIG. 1. The phase and data modulated optical pulses of enriched spectrum generated by an optical transmitter 11 are propagating via dispersion compensated transmission line 12. In transmission line 12, the optical pulses are affected by linear dispersion and nonlinear SPM resulting in pulse distortion. Each span of SM optical fiber 21 (FIG. 2) is supplied with a dispersion compensator 22 followed by an optical amplifier 23 for linear dispersion compensation and maintenance of intensity of the optical pulses. Phase distortion of the optical pulse induced by SPM follows the pulse intensity profile. This phase distortion produces a frequency chirp accumulating along transmission line 12. If the optical transmitter 11 generates Fourier-transform limited pulses having no chirp, accumulation of SPM-related distortion can not be compensated unless quasi-soliton transmission is arranged. Accumulation or depletion of the pulse spectrum inevitably leads to the pulse shape distortion.

In the present invention, the optical pulses launched into the optical fiber have an enriched spectrum and subsequent frequency chirp which is opposite to the SPM-induced chirp. SPM-induced frequency chirp is monotonically accumulated along the fiber span and subtracted from initial pulse chirp introduced by the transmitter. Respectively, the spectral content of the pulse is depleted, and the spectrum narrows down toward the spectral width of the Fourier-transform limit for a pulse of the same duration. While the pulse spectrum remains enriched, the temporal shape of the pulse changes only slightly, and the transmission remains error-free. With the spectral width comparable to the Fourier-transform limit, the pulse distortion becomes significant. At this point, the pulse reaches its maximum error-free propagation length, and should be received.

This qualitative description is fully supported by analytical and numerical computations. In the retarded time frame moving together with the pulse, its propagation is described by a Nonlinear Shrodinger Equation (NSE):

$$-i\frac{\partial u}{\partial z} = \frac{\partial^2 u}{\partial t^2} + \varepsilon|u_0|^2 u \tag{3}$$

where u is field amplitude, z and t are coordinate and time in the retarded frame, and $\varepsilon =< 1$. In the no-dispersion case $$\left(\frac{\partial^2 u}{\partial t^2} = 0\right),$$

the evolution of SPM-induced chirp is [L. F. Mollenauer, J. P. Gordon, and P. V. Mamyshev, "Solitons in High Bit-Rate, Long-Distance Transmission", Chapter 12 in *Optical Fiber Communication Systems*, Vol. IIIA, Ed. I. P. Kaminow and T. L. Koch, Academic Press, San Diego, 1997]:

$$u(z,t)=u(0,t)\exp(i\varepsilon|u(0,t)|^2 z)$$

or for $z<<1$ $$u(z,t) \approx u(0,t)(1+i\varepsilon|u(0,t)|^2 z) \tag{4}$$

where $u(0,t)$ is the fundamental field at the fiber input. With non-zero dispersion, the solution may be presented as $$u(z,t) \approx u_0(z,t)(1+\varepsilon u_1(z,t)) \tag{5}$$

Insertion of (5) into (3) yields a system of two equations:

$$-i\frac{\partial u_0}{\partial z} = \frac{\partial^2 u_0}{\partial t^2} \tag{6}$$

$$-i\frac{\partial u_1}{\partial z} = \frac{2}{u_0}\frac{\partial u_0}{\partial t}\frac{\partial u_1}{\partial t} + |u_0|^2 \tag{7}$$

Equation (7) is equivalent to a system of two first order ordinary differential equation:

$$\frac{du_1}{dz} = i|u_0(z, t(z))|^2 \tag{8}$$

$$\frac{dt}{dz} = -2i\frac{\partial(\ln u_0)}{\partial t} \tag{9}$$

where Eq. (9) is a characteristic equation for the partial differential Equation (7). Eq. (8) shows that the SPM effect accumulates along the fiber, and both components $u_0$ and $u_1$ are functions of z. With non-zero dispersion, no exact SPM compensation may be achieved because the initial chirp of the optical pulse is defined at the fiber input. However, the SPM compensation is relevant where the pulse power is high, which is at the input of fiber span. Creating the initial frequency chirp of the same shape and of opposite sign to (8) at the input of the fiber span reduces the impact of SPM very significantly.

Figure 3:
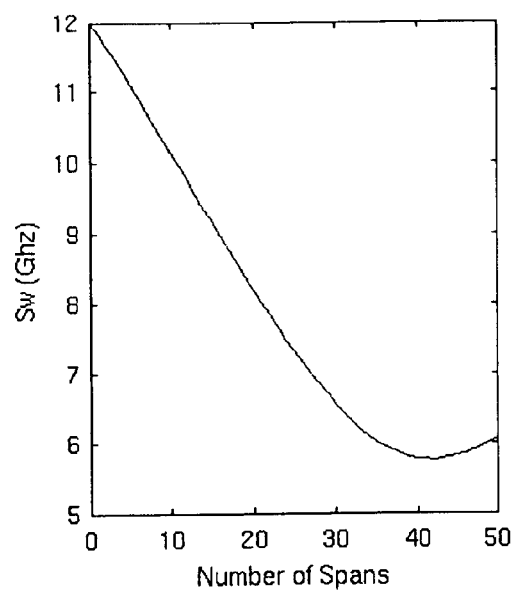
FIG. 3 shows a numerical simulation of spectral depletion along an error free propagation region comprising a plurality of spans of the optical fiber according to the present invention.
Figure 4:
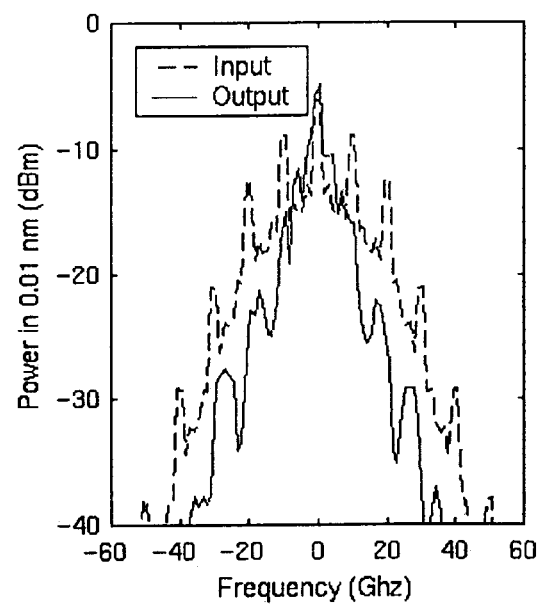
FIG. 4 shows a numerical simulation of signal power spectra at an input and an output of the error free propagation region according to the present invention.
Figure 5:
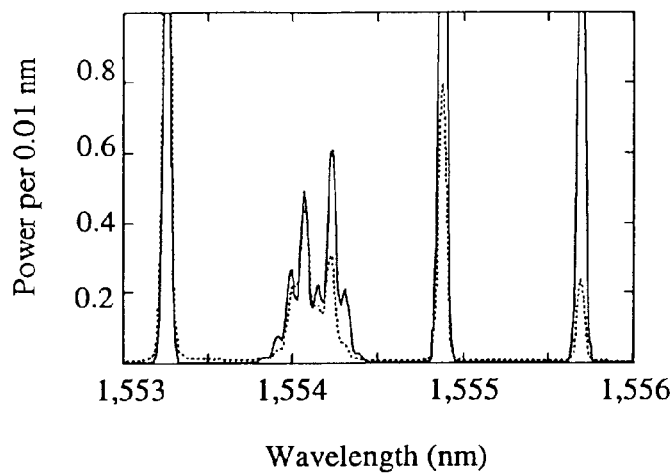
FIG. 5 shows experimental data of signal power spectra at the input and the output of the error free propagation region according to the present invention.

Numerical simulations and experimental results illustrating the above considerations are presented in FIGS. 3–5.

FIG. 3 shows the calculated pulse spectral width for PRBS data pulses with frequency chirp as a function of the number of spans proportional to the length of a realistic transmission line, with a span length of 80 km. According to the data presented in FIG. 3, the maximum error free transmission length is within several thousand kilometers (4,000 km for the parameters used for calculations of FIG. 3). In FIG. 4, the calculated spectra are presented for input and output of the PRBS pulses utilizing the same parameters as in FIG. 3. FIG. 5 shows experimentally observed spectra for transmission through 4,000 km of single-mode fiber SMF-28 in ring configuration. The PRBS pulses with frequency chirp generated by a directly modulated laser were sent through the channel centered at 1554.1 nm. These pulses were spectrally enriched at the transmission line input to 35 GHz; at the output, the spectral width is 25 GHz. Other three channels centered at 1553.3 nm, 1554.9 nm and 1555.7 nm are CW laser loaded.

The concept of propagation of spectrally enriched optical pulses with spectral depletion along the transmission line is a method of optical signal transmission according to the present invention. This concept may be implemented in several embodiments. Each of these embodiments utilizes the dispersion compensated transmission line comprising a plurality of spans of the optical fiber. Commercially suitable spans have a length in a range between about 50 km to 120 km with respective dispersion in a range of $$(2-17)\frac{ps}{nm*km}.$$

To obtain the dispersion compensation and power restoration, each span 21 is supplied with a dispersion compensator 22 and at least one optical amplifier 23. The dispersion compensator 22 introduces dispersion opposite to the dispersion of the optical fiber, and serves to compensate the fiber dispersion. The dispersion compensator 22 may be made of a segment of dispersion compensating fiber, or a Bragg grating. The optical amplifier 23 restores the intensity of an optical signal propagating via SM span 21 to its initial value.

Preferably, the optical pulses generated by the optical transmitter have duration of about 20% to 50% of the bit period. The bandwidth of the spectrally enriched optical pulses at the input of dispersion compensated transmission line exceeds the Fourier-transform limit of this duration respectively by 50% to 200%. Pulse frequency chirp introduced to the spectrally enriched optical signals is similar to the chirp frequency introduced by SPM but has the opposite sign. As a result, the nonlinear distortion induced by SPM in a periodically amplified and dispersion compensated transmission line leads to an incremental depletion of the frequency chirp of the spectrally enriched pulses. If the temporal dependence of the frequency chirp is chosen properly, then the propagation of the spectrally enriched optical pulse causes a gradual depletion of its frequency chirp while the pulse temporal shape does not change significantly.

Figure 6:
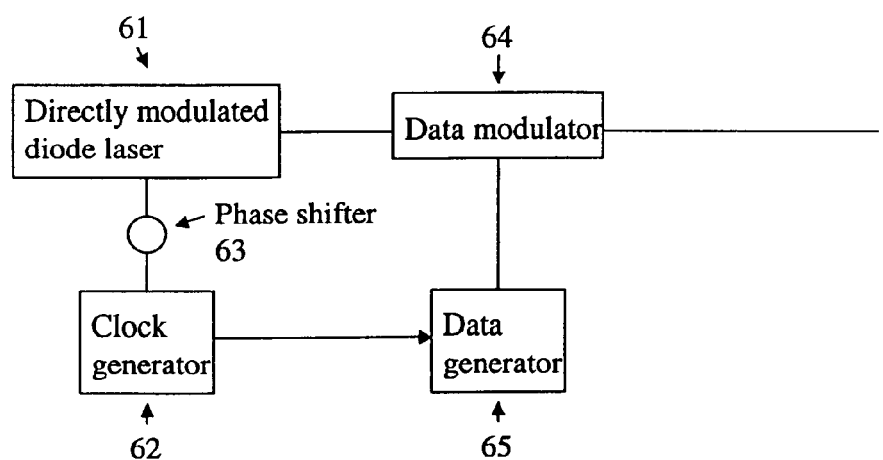
FIG. 6 shows a schematic diagram of an optical transmitter having a directly modulated diode laser with an external data modulator according to the present invention.

The optical transmitter utilizes an optical source for generating optical pulses. Different types of optical sources may be used depending on the commercial application. In FIG. 6, a directly modulated laser diode 61 is used as an optical source of frequency chirped optical pulses. Conventionally, system designers avoid direct modulation or gain switching of laser diodes because laser pulses exhibit dynamic shift of the lasing frequency (frequency chirp), which traditionally is considered damaging the transmission. The frequency chirp proportional to the time derivative of the modulated phase relates to the time dependence of the carrier density (G. P. Agraval and N. K. Dutta, "*Semiconductor Lasers*", New York, 1993). With higher free carrier density (at the front of the pulse) the emitted frequency is higher, and with depletion of free carriers at the pulse tail, the emitted frequency is lower than that emitted by the laser operating in CW mode.

In the embodiments of the present invention, the direct modulation of laser diodes was discovered to be a useful application of a physical phenomenon customarily considered damaging to the signal transmission. A clock generator 62 is employed to drive the diode laser. The frequency chirp of the optical pulses emitted by the laser 61 depends significantly on the driving voltage of the clock generator 62. A phase shifter 63 provides time delay adjustment between the clock generator 62 and a data generator 65. A data modulator 64 driven by the data generator 65 externally modulates the sequence of optical pulses emitted by the laser 61.

Figure 7:
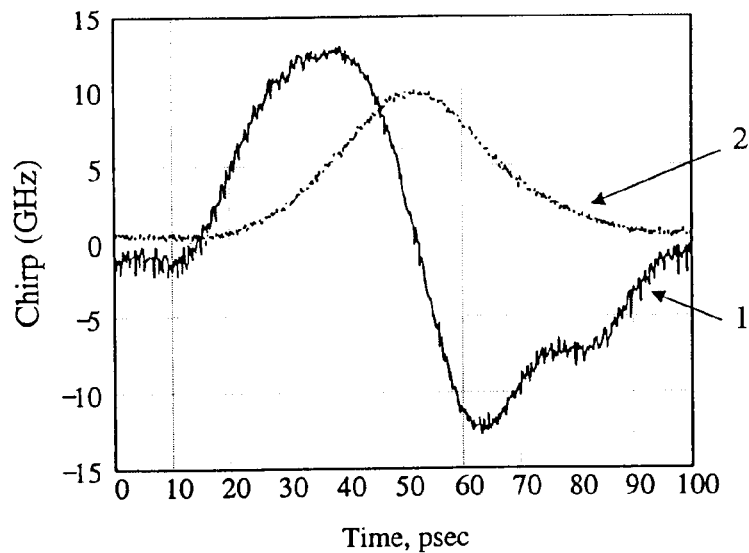
FIG. 7 illustrates a frequency chirp of the optical pulses emitted by the directly modulated laser.

In FIG. 7, a typical shape of the optical pulse (curve 1) is shown for a directly modulated diode laser, together with the experimentally measured frequency chirp (curve 2). The frequency chirp of a few tens of GHz is generally obtained in contemporary practice which makes this embodiment particularly suited for OC-192 (10 Gb/s) data transmission. When the −15 laser diode is modulated at a frequency comparable to its relaxation frequency (typically about 5–10 GHz), the frequency chirp has a shape opposite to the frequency chirp induced by SPM.

Figure 8:
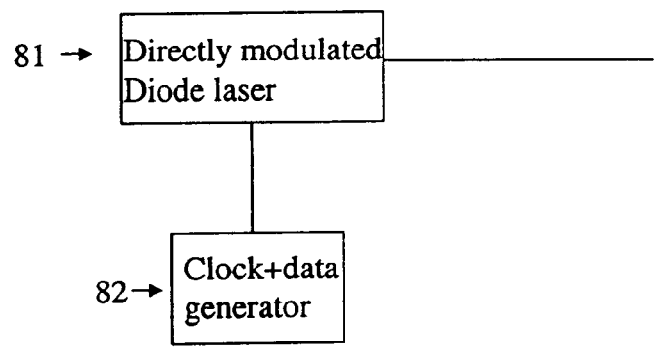
FIG. 8 shows a schematic diagram of an optical transmitter having a directly modulated diode laser with internal data modulation according to the present invention.

FIG. 8 shows a directly modulated diode laser 81 driven by an electronic unit 82 combining functions of clock and data modulation. This is yet another example of the directly modulated laser diode which output pulses exhibit dynamic frequency shift (chirp) due to the changes of the free carrier concentration. The laser modulation in this case is not periodic, but the frequency behavior in the pulses from this laser is very similar to that described above: higher frequencies in the beginning of the pulse and lower frequencies in its tail. In this embodiment, external modulation of the laser output is not required. A high degree of integration of electrical and optical functions provides significant advantages of this embodiment for commercial applications.

Figure 9:
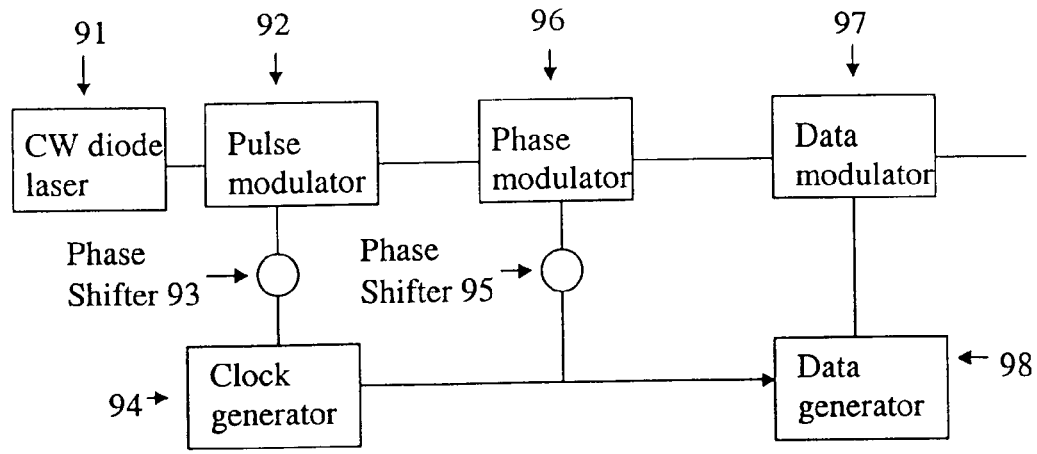
FIG. 9 shows a schematic diagram of an optical transmitter having a CW diode laser with external phase and data modulation according to the present invention.

In another embodiment, shown in FIG. 9, the optical transmitter can utilize a CW semiconductor diode laser 91 as a light source. To provide transmitter functions, this embodiment employs three modulators: pulse modulator 92, phase modulator 96 and data modulator 97 driven by clock generator 94 and data generator 98, respectively. Pulse modulator 92 is driven by clock generator 94 through phase shifter 93 and operates in a linear regime. Phase modulator 96 is driven by clock generator 94 through phase shifter 95, and data modulator 97 is driven by data generator 98. The sequence of three modulators is used to produce data modulated spectrally enriched optical pulses. Significant reduction of nonlinear distortion within the transmission line can be achieved by adjusting the voltage applied to the phase modulator 96 and obtaining the frequency chirp of the optical pulses similar to the frequency chirp induced by SPM but with the opposite sign.

Figure 10:
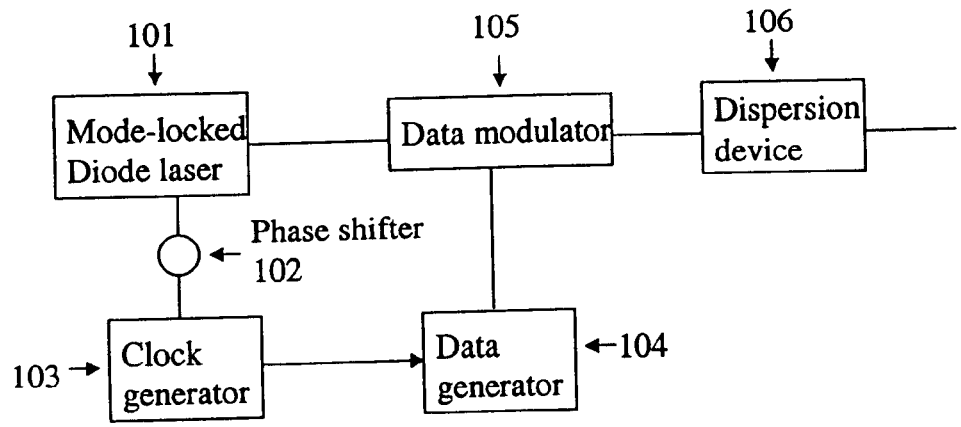
FIG. 10 shows a schematic diagram of an optical transmitter having a mode-locked laser with an external data modulator and a dispersion device according to the present invention.

In FIG. 10, yet another embodiment is presented utilizing a mode-locked diode laser 1101 as a source of optical pulses. A sequence of short optical pulses emitted by the diode laser 101 is modulated by a data modulator 105, and stretched and chirped by a dispersion device 106. The mode-locked laser 101 and the data modulator 104 are driven by a clock generator 103 and a data generator 104, respectively synchronized to each other. A phase shifter 102 is used to adjust the phase delay between driving voltages for the mode-locked laser 101 and the data modulator 105. The mode-locked laser 101 provides short optical pulses of about 5% to 15% of the bit period having optical spectrum adequate for compensation of SPM-induced nonlinear spectral products. Data modulator 105 is used to load digital data into this sequence of short optical pulses. The dispersion device 106 connected to an output of data modulator 105 stretches the duration of these pulses to about 20% to 50% of the bit period, and introduces a frequency chirp working against the frequency chirp introduced by SPM.

Figure 11:
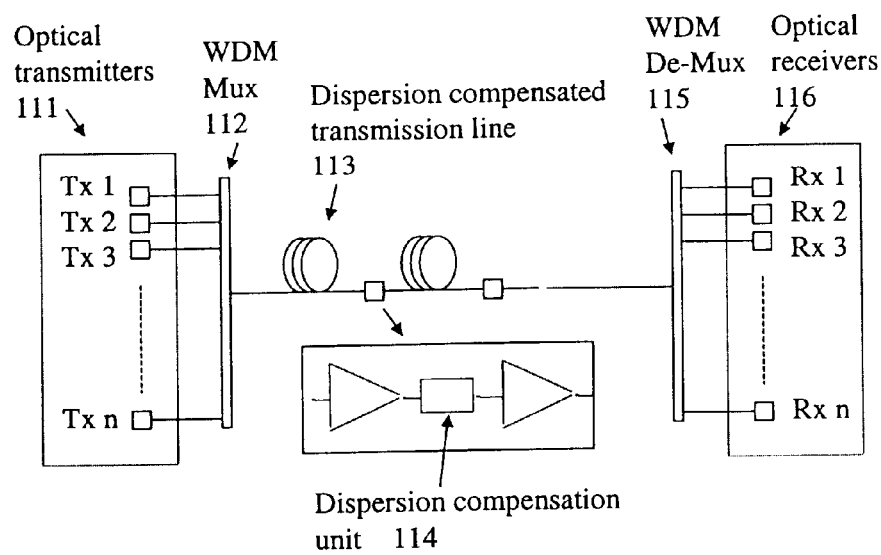
FIG. 11 shows a schematic diagram of a multichannel WDM communication system for propagating phase and data modulated spectrally enriched optical pulses via a dispersion compensated transmission line according to the present invention.

A significant number of the fiber optic systems deployed in the field are multichannel WDM systems. FIG. 11 shows a multichannel WDM communication system for propagating spectrally enriched data modulated optical pulses via a dispersion compensated transmission line. The WDM system comprises a plurality of WDM optical transmitters 111 for generating data modulated spectrally enriched optical pulses. The generated pulses in each channel have a spectrum that is substantially wider than the spectrum of Fourier-transform limited pulses of the same duration. A WDM multiplexer 112 combines outputs of the WDM optical transmitters 111 into a multiplexed optical signal. The multiplexed optical signal is transmitted via a dispersion compensated transmission line 1113 comprising a plurality of spans and a plurality of dispersion compensation units 114. Each dispersion compensation unit is placed between each pair of adjacent spans. A WDM demultiplexer 115 demultiplexes the WDM multiplexed optical signal into a plurality of individual optical signals. A plurality of optical receivers 116 corresponding to the plurality of the WDM optical transmitters 111 receive respective pluralities of optical pulses having spectra comparable to the Fourier-transform limit. The error free propagation distance is the maximum length of dispersion compensated transmission line within which the temporal shape of each pulse is unchanged (although the pulse spectrum would have been depleted to the Fourier-transform limit).

The invention has been described above by way of examples but these examples are not intended to limit the scope of the invention. The disclosure is intended to be interpreted broadly, and not intended to represent all modifications and variations that may be apparent to a person skilled in the art without departing form the spirit and scope of the present invention as defined by the appended claims.

What is claimed is:

1. A system for transmitting signals over an optical fiber using spectrally enriched optical pulses comprising:

an optical transmitter with an optical source for generating data modulated spectrally enriched optical pulses having a spectrum substantially wider than a spectrum of Fourier-transform limited pulses of the same duration;

said optical transmitter including a clock generator connected to said directly modulated diode laser for providing said spectrally enriched optical pulses with said frequency chirp; and a data modulator connected to an output of said directly modulated diode laser for modulating externally said optical pulses;

a data generator connected to said data modulator for driving said data modulator; and a phase shifter connected to said directly modulated laser for providing time delay adjustment between said clock generator and said data generator, the optical fiber coupled to said optical transmitter for propagating said optical pulses throughout the spectrum of said optical pulses being shrinked while propagating along the optical fiber, and an optical receiver within the optical fiber at or beyond an error free propagation distance from said optical transmitter for receiving said optical pulses.

2. The system for transmitting signals of claim 1, wherein a spectral enrichment of said optical pulses is provided by a frequency chirp.

3. The system for transmitting signals of claim 2, wherein said error free propagation distance is a segment of the optical fiber having an input and output; a temporal shape of each of said optical pulses is substantially the same at said input and output, and the spectrum of said optical pulses shrinks from the spectrum substantially wider than the Fourier-transform limit to the spectrum comparable to the Fourier-transform limit.

4. The system for transmitting signals of claim 3, further comprising at least one dispersion compensating unit having a dispersion compensator and at least one optical amplifier, said dispersion compensating unit placed between said optical transmitter and optical receiver for restoration of the temporal shape of each of said optical pulses.

5. The system for transmitting signals of claims 4, wherein said optical source is a directly modulated diode laser.

6. An optical transmitter for long haul optical fiber system comprising:

a laser source for providing as sequence of spectrally enriched optical pulses with a frequency chirp, said optical pulses having a spectrum substantially wider than a spectrum of Fourier-transform limited pulses of the same duration;

a clock generator connected to said laser source for driving said laser source;

a data modulator connected to an output of said laser source for modulating externally said sequence of optical pulses;

a data generator connected to said data modulator for driving said data modulator; and a phrase shifter connected to said laser source for providing time delay adjustment between said clock generator and said data generator.

7. The optical transmitter of claim 6, wherein said optical pulses have duration about 20% to 50% of the bit period and a respective bandwidth that exceeds the Fourier-transform limit by 50% to 200%.

8. The optical transmitter of claim 7, wherein said laser source is a directly modulated diode laser.

9. The optical transmitter of claim 8, wherein a relaxation frequency value of said directly modulated laser is about 50% to 150% of a frequency value of said clock generator.

10. The optical transmitter of claim 9, wherein the relaxation frequency value of said directly modulated laser is preferably about 70% to 120% of the frequency value of said clock generator.

11. The optical transmitter of claim 7, wherein said laser source is a mode-locked diode laser.

12. The optical transmitter of claim 11, further comprising a dispersion device connected to an output of said data modulator for stretching said optical pulses to a duration about 20% to 50% of the bit period and introducing a frequency chirp opposite to a frequency chirp of an optical fiber.

* * * * *

UNITED STATES PATENT AND TRADEMARK OFFICE
CERTIFICATE OF CORRECTION

PATENT NO. : 6,876,818 B1
DATED : April 5, 2005
INVENTOR(S) : Bai et al.

It is certified that error appears in the above-identified patent and that said Letters Patent is hereby corrected as shown below:

Column 6,
Line 18, delete "$\in = <1$" and insert -- $\in = <<1$ --
Line 47, delete the word "equation" and insert the word -- equations --

Column 8,
Line 61, delete the word "1101" and insert the word -- 101 --

Column 9,
Line 24, delete the word "1113" and insert the word -- 113 --
Line 43, delete the word "form" and insert the word -- from --

Signed and Sealed this

Twenty-sixth Day of July, 2005

JON W. DUDAS
*Director of the United States Patent and Trademark Office*